Nov. 1, 1938. A. B. TRENCAVEL 2,135,367
HOT WATER HEATING DEVICE
Filed Feb. 12, 1937 2 Sheets-Sheet 1

INVENTOR.
Albert B. Trencavel
BY Irving Seidman
his ATTORNEY.

Nov. 1, 1938. A. B. TRENCAVEL 2,135,367
HOT WATER HEATING DEVICE
Filed Feb. 12, 1937 2 Sheets-Sheet 2

INVENTOR.
Albert B. Trencavel
BY
Irving Seidman
his ATTORNEY.

Patented Nov. 1, 1938

2,135,367

UNITED STATES PATENT OFFICE 2,135,367

HOT WATER HEATING DEVICE

Albert B. Trencavel, New York, N. Y., assignor, by direct and mesne assignments, to American Hot Water Systems, Inc., a corporation of Delaware Application February 12, 1937, Serial No. 125,396

1 Claim. (Cl. 122—367)

This invention relates to a system of utilizing the deflected waste heat from sources such as stoves, coffee urns, broilers and ovens of various types.

Broadly, it is an object of this invention to provide a device for the heating of water and to create a more rapid circulation of the heated water so that a greater amount of hot water can be stored in a tank during a given period.

More specifically, it is an object of this invention to provide for a type of heating device which will fit within the average known stove, range, oven, broiler, coffe urn and the like, so that no material variation need be made to such article in order to make an installation of the heating device.

Another object of this invention is to cause a progressive and continuous movement of water in tthe process of being heated by utilizing the deflected and refracted heat in stoves, ovens, ranges and the like.

Another object of this invention is to produce sufficient hot water, virtually without cost, by utilizing the waste heat of stoves, ovens, ranges and the like.

Another object of this invention is to increase the heat absorbing surface of the device in order to increase the temperature of the water in the process of being heated and aiding such water to travel faster along heat pressure lines in order to more rapidly fill a storage tank.

Another object of this invention is to provide a device having an inlet and outlet along tangential lines so that the cold water flowing in and the hot water leaving the device for the storage tank will not be retarded by any abrupt angles in the water pipe and will move in the direction of the tangent created by the water pipe and the coil thus reducing any resistance in the flow.

This invention comprises a novel construction, a combination of elements and an arrangement of parts and the device possesses characteristics, features, properties and relation of elements all of which will be exemplified in the following detailed description. For a fuller understanding of the nature and objects of this invention, reference is had to the following detailed description in connection with the accompanying drawings, in which.

Figure 1:
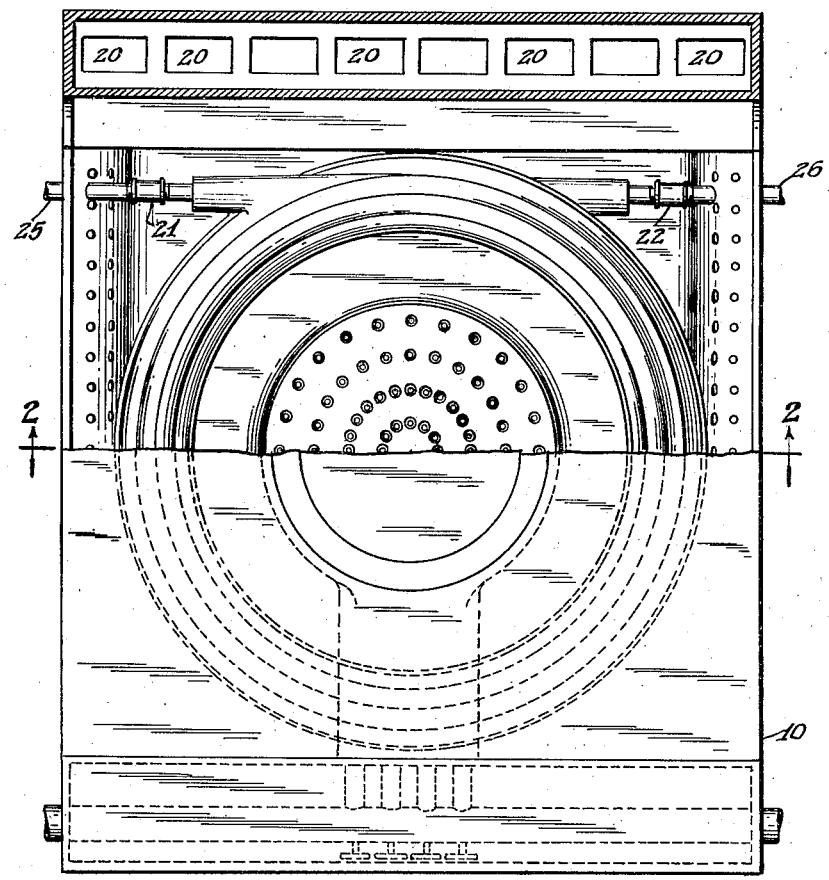
Figure 1 is a top view, partly in section, of a gas range containing the heating device used in connection with the invention.
Figure 2:
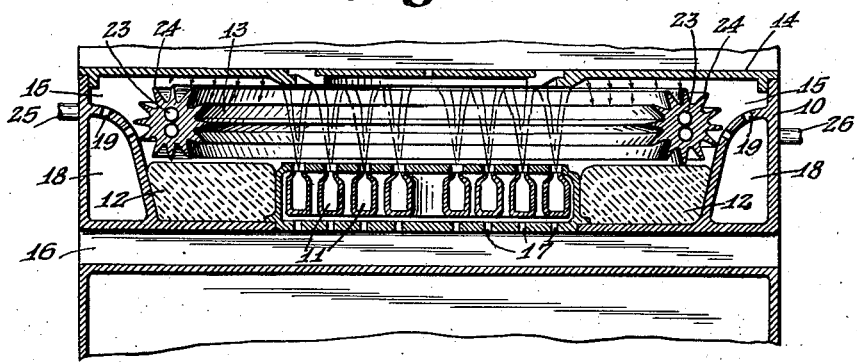
Figure 2 is a vertical section taken through a portion of the gas range, along line 2—2 of Figure 1.
Figure 4:
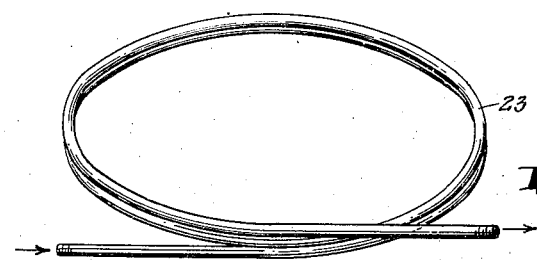
Figure 4 is a top view of the water coil which is incased within the circular housing.

Referring to the drawings, 10 represents the gas range frame, 11 the gas burner in said frame, 12 represents the refractory brick foundation around the gas burner and underneath the circular housing 13. The gas range top 14 is supported by the gas range frame 10 above the circular housing and the gas burners at sufficient distance to get the maximum benefit from the flame of the gas burner 11.

The gas range frame 10, surrounds the air chamber 15 in which combustible gases accumulate, said air chamber lying between the refractory brick foundation 12 and the gas range top 14.

When the burner 11 is in operation, a column of air enters the air chamber 15 through air passage 16 in the gas range frame 10 and thence through the air passages 17 of the gas burner 11, the heated combustible gases collecting in the air chamber 15 and passing thence into the lateral flues 18, thence through the apertures 19 in the said lateral flues 18 and thence passing through the vertical flues 20 in the regular manner well known in the manufacture of stoves, gas ranges and the like.

Within the combustion chamber 15 in which the combustible gases accumulate, the circular housing 13 rests upon but is not attached to the refractory brick foundation 12, said housing 13 being supported by the water coil 23 which is connected to piping 25 and 26 coming from and leading to a water tank, said piping 25 and 26 being connected to the terminals of the water coil 23 by streamlined couplings 21 and 22, as shown in Fig. 1. The housing may be oval, square or any other suitable shape. The water coil 23 is solidly incased and embedded within the housing 13, which completely surrounds the gas burner 11 and lies above the said burner 11 and within the combustion chamber 15 so that when the gas burner 11 is in operation the heat of the flame from the said gas burner will be deflected from the bottom of the gas range top 14 and be deflected toward the circular housing 13 and the refractory brick foundation 12 upon which it rests so that the deflected heat will be absorbed by the concentric, circular and continuous fin-like ridges 24 radiating from the circular housing 13, not only directly but also indirectly from the refracted heat of the refractory brick foundation 12.

The circular housing 13 may be cast from a highly heated absorbing metal such as aluminum, copper, nickel, antimony or alloys comprising such metals or compositions of such metals. The water coil 23, which is firmly and completely incased within the said circular housing 13 is formed of a suitable non-corrosive metal, such as, copper, or the like; the coils of said water coil being wound one above the other in a vertical helicoidal manner.

The inlet of the helicoidal water coil 23, is below and the outlet is above, since the water is hot when it leaves the water coil 23; hot water having a tendency to rise thus furthering the acceleration of the water flow. The inlet and the outlet of the water coil are purposely placed in a tangent to the path of the helicoidal water coil in order to reduce the resistance to a minimum of the inflowing cold water and the outflowing hot water so as to eliminate any movement against any angular pipe joining.

Figure 3:
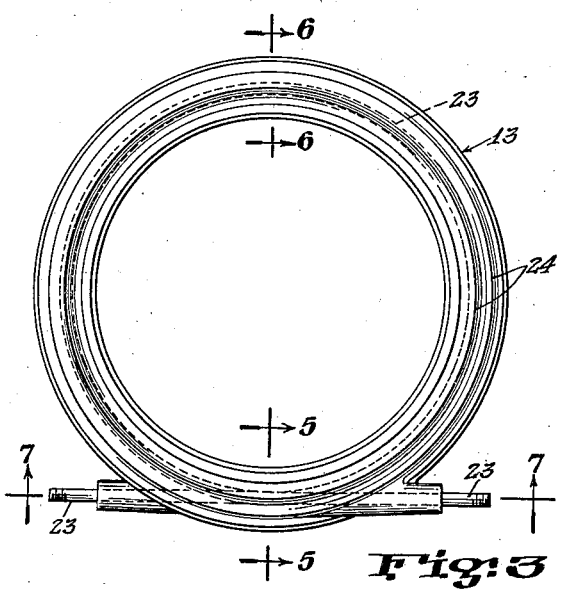
Figure 3 is a top view of the circular housing of the water coil.
Figure 5:
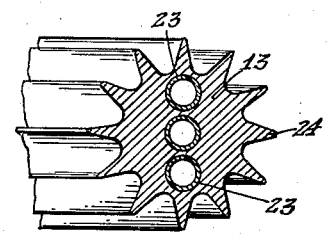
Figures 5 and 6 are cross sections taken through the circular housing, along lines 5—5, 6—6, respectively of Figure 3.
Figure 6:
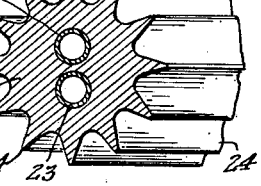
Figure 8:
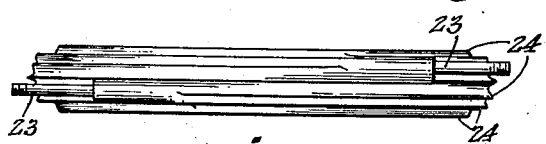
Figure 8 is a detail of a portion of the circular housing.
Figure 7:
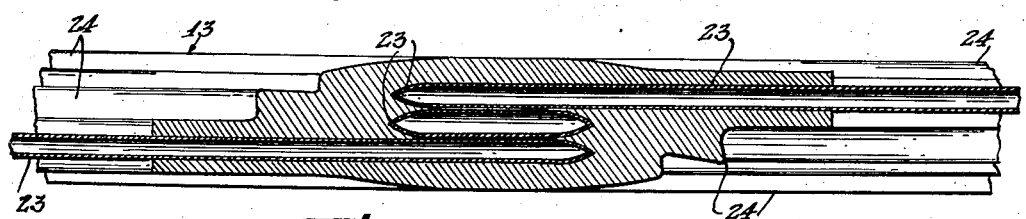
Figure 7 is a greatly enlarged cross section taken through the circular housing, along line 7—7 of Figure 3.

A preferred means of solidly and firmly incasing the helicoidal water coil 23 would be to place the said water coil within the casting mould so that it will act as a core and the metal which forms the circular housing 13 is cast around the water coil 23 so that the hardened casting will have within the center thereof, the water coil 23 firmly and solidly embedded as shown in Figure 3.

The circular helicoidal housing 13 has radiating therefrom continuous, concentric circular fin-like ridges running parallel and circular to the circular helicoidal housing 13. Such concentric, continuous fin-like ridges around helicoidal housing 13 present an enlarged surface for the collection of the deflected and refracted waste heat so that a maximum of heat will be collected and transmitted toward the core of the housing 13 and consequently to the embedded water coil 23.

The heat which is deflected from the bottom of the gas range top 14 is gathered by the fin-like ridges 24 which are directly in the path both of the deflected and the refracted heat. The collected heat creeps along the fin-like ridges 24 in a circular manner and toward the core of the housing and gathers in thermal or heat zones, such heat zones being formed at the depressions between the fin-like ridges 24. The thermal creep produced by the concentrated heat along the thermal zone at the depressions of the fin-like ridges 24 is now carried through the metal structure of the helicoidal housing 13 and thence carried to the inner surface of the water coil 23, producing a continuous thermal heat zone which is a replica of that produced by the concentric fin-like ridges of the housing 13. This continuous heat zone forms a thermal path around the inner surface of the water coil 23.

The heat which is refracted from the refractory brick foundation is of a lesser intensity due to heat loss by absorption of the brick foundation. The action of this refracted heat upon the lower part of the fin-like ridges 24, produces the same thermal creep but of lesser intensity. However, the refracted heat being of lesser intensity than the deflected heat from the bottom of the gas range 14 it follows that the thermal path around the inner surface of the water coil 23 will have a greater temperature at the upper part than at the lower part. This difference of temperature between the upper and lower part of the thermal path, produces a thermal thrust or stress in the metallic structure along the heated path.

The latent heat released by the change in temperature of the water creates a state of turbulence in the water causing acceleration of flow of the heat in the water of the water coil and thence transmitted to the water in the storage tank.

I claim:

In a hot water heating unit, a helical coil of pipe, a cast metal housing embedding said coil, said coil having an inlet and an outlet leading tangentially to and from same, and fin-like ridges projecting radially around the perimeter of said housing.

ALBERT B. TRENCAVEL.